United States Patent
Goyal et al.

(10) Patent No.: US 9,535,670 B2
(45) Date of Patent: *Jan. 3, 2017

(54) EXTENSIBLE CONTEXT BASED USER INTERFACE SIMPLIFICATION

(71) Applicant: International Business Machines Corporation, Armonk, NY (US)

(72) Inventors: Maneesh Goyal, Kanata (CA); Christian M. Vogt, Stittsville (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/948,382

(22) Filed: Nov. 22, 2015

(65) Prior Publication Data

US 2016/0077812 A1 Mar. 17, 2016

Related U.S. Application Data

(63) Continuation of application No. 11/953,652, filed on Dec. 10, 2007, now Pat. No. 9,256,404.

(51) Int. Cl.
*G06F 9/44* (2006.01)
(52) U.S. Cl.
CPC ...................... *G06F 8/35* (2013.01)
(58) Field of Classification Search
CPC ............... G06F 8/35; G06F 8/10; G06F 8/20; G06F 8/24

USPC ........................................................ 717/104
See application file for complete search history.

(56) References Cited

U.S. PATENT DOCUMENTS

| | | | | |
|---|---|---|---|---|
| 7,783,729 B1* | 8/2010 | Macaluso | ................ | G06F 8/63 455/414.2 |
| 2007/0157179 A1* | 7/2007 | Seeger | ...................... | G06F 8/34 717/136 |
| 2009/0006954 A1* | 1/2009 | Jackson | ............ | G06F 17/30569 715/700 |
| 2009/0030711 A1* | 1/2009 | Puccio | ............... | G06Q 10/0635 705/301 |

* cited by examiner

*Primary Examiner* — Anna Deng
(74) *Attorney, Agent, or Firm* — Steven M. Greenberg, Esq.; CRGO Law

(57) ABSTRACT

Embodiments of the present invention address deficiencies of the art in respect to modeling tools and provide a method, system and computer program product for extensible context based user interface simplification of modeling components for a modeling tool. In an embodiment of the invention, a method for extensible context based user interface simplification can be provided for a model driven development tool. The method can include detecting a context change to a new context in a model driven development tool, locating tool items mapped to the new context, and displaying the located tool items in the model driven development tool.

12 Claims, 1 Drawing Sheet

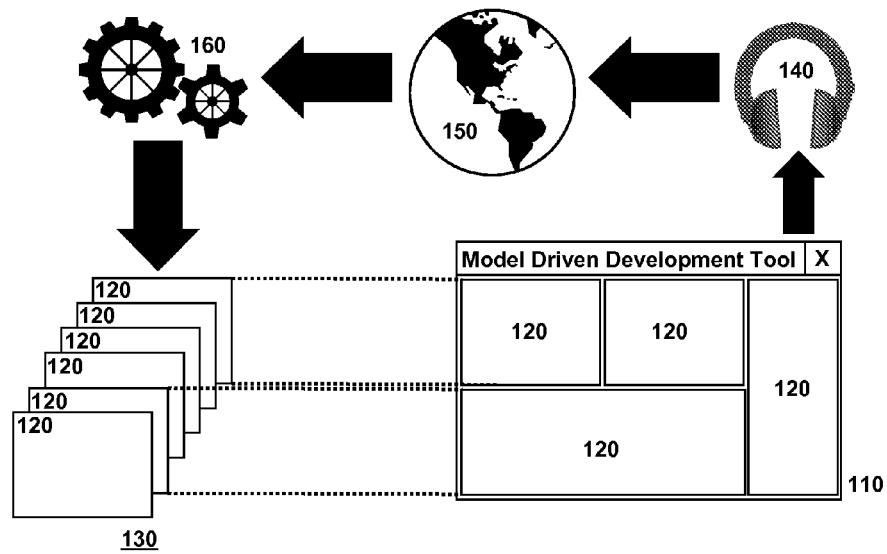
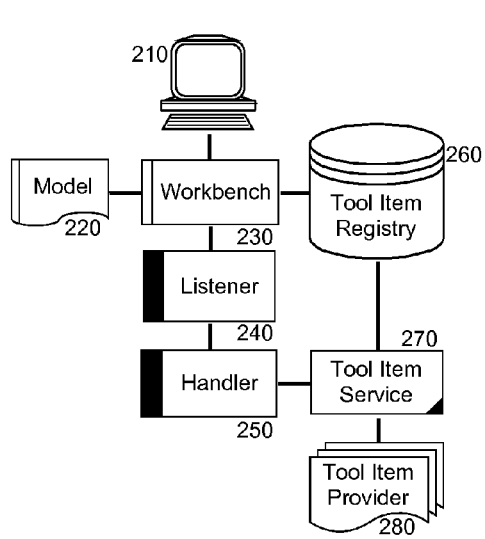
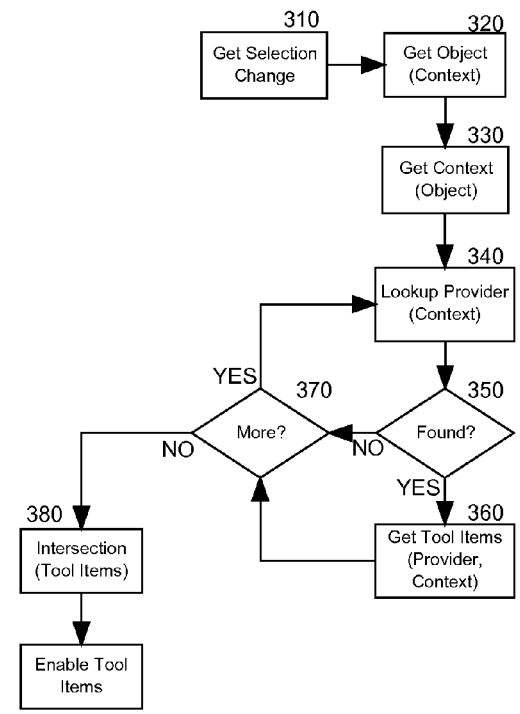
FIG. 1
FIG. 2
FIG. 3

EXTENSIBLE CONTEXT BASED USER INTERFACE SIMPLIFICATION

CROSS-REFERENCE TO RELATED APPLICATIONS

This application is a Continuation of U.S. patent application Ser. No. 11/953,652, filed on Dec. 10, 2007, which is incorporated herein by reference in its entirety.

BACKGROUND OF THE INVENTION

Field of the Invention

The present invention relates to the field of model driven development and more particularly to user interface management in a model driven development environment.

Description of the Related Art

The Model Driven Architecture (MDA) approach has been proposed and promoted over the past few years as a methodology for streamlining the design and implementation of enterprise systems. Generally, in MDA each design artifact of the enterprise system can be represented as a Platform Independent Model (PIM) that is generated by or is compliant with a Computation Independent Model. This PIM is able to be transformed to a corresponding Platform Specific Models (PSM) and ultimately to source code that complies with specific programmatic paradigms and patterns. In this context, a PIM represents the elements and components of a software system in a way that is not bound or dependent to a specific implementation technology. By comparison, a PSM represents the elements and components of a software system in a way that directly relates to the implementation technology that will be used for implementing such a system.

Even though MDA frameworks have caught the attention of the software engineering community as a way to increase programmer productivity and overall system robustness through the disciplined manipulation and transformation of models and ultimately code generation, MDA as a methodology has remained so far only as a "guideline" or "standard practice" that is left to be implemented by the individual organizations and software vendors. In this respect, important questions regarding which types of models are to pertain to PIMs and PSMs, how transformations are to be encoded and enacted, how constraints are to be denoted and validated, and how source code is to be generated, remains left to software vendors, software architects and software developers to further design and implement.

Currently, there are a number of tools that support MDA compliant or semi-compliant software development. More specifically, existing MDA tools can be classified in two main categories namely, "full-MDA-capability" tools that incorporate modeling, transformation, and code generation infrastructure, and "limited-MDA-capability" tools that incorporate only code generation infrastructure using specific, typically unified model language (UML), models as input. In either circumstance, ensuring that modeling tools satisfy every aspect of the development process can be the key to successful model driven development.

A typical software development lifecycle involves several stages: requirements, design, implementation, testing and operation, and several persons with different roles working on the various stages. Depending on the development model chosen, each of the development lifecycle states may be revisited during the development process. For consistency, a single modeling tool may be chosen to carry out modeling the entire development process. Such a tool can become very complex and overwhelm the developer, when the intent was to ease adapting to change and simplify use through a unified interface.

The modeling tool interface can grow in complexity as the number of supported tool components increase. To reduce the complexity, a separate view of the model may be setup for each component. This however has the drawback, for those developers which take on several roles, of switching views constantly to gain access to the interface tools they need. These developers would be better off with an interface tailored to their role. The role of the developer will be dependent upon their job role as well as the type of model being worked on. Although a developer's role may involve design and implementation, the model itself may only support requirements and design. Therefore the modeling tool interface should not be tailored to the model to satisfy the model, but to decrease complexity experienced by the developer. More to the point, the modeling tool interface should be tailored to provide a simplified experience for the developer.

BRIEF SUMMARY OF THE INVENTION

Embodiments of the present invention address deficiencies of the art in respect to modeling tools and provide a novel and non-obvious method, system and computer program product for extensible context based user interface simplification of modeling components for a modeling tool. In an embodiment of the invention, a method for extensible context based user interface simplification can be provided for a model driven development tool. The method can include detecting a context change to a new context in a model driven development tool, locating tool items mapped to the new context, and displaying the located tool items in the model driven development tool.

In one aspect of the embodiment, detecting a context change to a new context in a model driven development tool can include detecting a selection of a model component associated with a context object in the model driven development tool, the context object providing the context. In another aspect of the embodiment, detecting a context change to a new context in a model driven development tool can include detecting a selection of a model associated with a context object in the model driven development tool, the context object providing the context.

In yet a further aspect of the embodiment, locating tool items mapped to the new context can include locating tool item providers providing tool items for the new context, and selecting only ones of the tool items mapped to the new context. In even yet a further aspect of the embodiment, the method also can include further selecting an intersection of the ones of the tool items mapped to the new context and also ones of the tool items mapped to other contexts. Finally, in even yet another aspect of the embodiment, displaying the located tool items in the model driven development tool further can include hiding tool items configured for mapping to contexts, but not mapped to the new context.

In another embodiment of the invention, a model driven development data processing system can include a workbench providing a view to a model including different model components. The system can include a listener coupled to the workbench and configured to detect a change to a new context in the model, and a tool item registry of tool items mapped to respective contexts. The system also can include a tool item service coupled to multiple different tool item providers of tool items in the workbench. The service can include program code enabled to respond to a context change to a new context detected by the listener, to locate tool items mapped in the tool item registry to the new context, and to display the located tool items in the workbench.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for extensible context based user interface simplification for a model driven development tool;

FIG. 2 is a schematic illustration of a model driven development data processing system configured for extensible context based user interface simplification; and, FIG. 3 is a flow chart illustrating a process for extensible context based user interface simplification for a model driven development tool.

DETAILED DESCRIPTION OF THE INVENTION

Embodiments of the present invention provide a method, system and computer program product for extensible context based user interface simplification for a model driven development tool. In accordance with an embodiment of the present invention, the context object for a selected model component in a model driven development tool can be compared to a set of related tool items for the model driven development tool. Thereafter, those tool items matching elements of the context object can be selected and reduced to eliminate redundancies and the remaining matched tool items can be displayed in the model driven development tool while other tool items can be hidden from view in the model driven development tool. In this way, the complexity of the user interface for the model driven development tool can be reduced.

In further illustration, FIG. 1 is a pictorial illustration of a process for extensible context based user interface simplification for a model driven development tool. As shown in FIG. 1, a model driven development tool 110 can be provided to include multiple different tool items 120 in support of a model driven development project. As an end user interacts with model components through the model driven development tool 110, a listener 140 can detect a change of selected context object as the user selects different model components of the model under study. In response, elements of the new context object can be compared to a mapping 150 to identify a set of tool items 120 associated with the elements of the context object. In turn, simplification logic 160 can reduce the identified set of tool items 120 to eliminate redundancies and a selection of the tool items 120 for display in the model driven development tool 110 while others can be hidden from view.

The process shown in FIG. 1 can be implemented in a model driven development environment. In illustration, FIG. 2 schematic depicts a model driven development data processing system configured for extensible context based user interface simplification. The system can include a host computer 210 supporting a workbench application 230 functioning as a model driven development tool. Specifically, the workbench application 230 can include a model 220 with multiple different interrelated components loaded for editing and management through the host computer 210.

A listener 240 can be coupled to the workbench 240. The listener 240 can be configured to detect a context change in the model 220. A handler 250, in turn, can be coupled to the listener 240. Further, a tool item service 270 can be coupled to the handler and also to a tool item registry 260 which in turn can be coupled to the workbench 230. The tool item registry 260 for example can include a listing of user interface components such as menus, menu items, context menu items, toolbar actions, and palette entries registered for participation in the user interface simplification process. Tool items listed in the tool item registry 260 can be provided manually by the user, for example.

In operation, the listener can detect a change in context for the workbench 230 through the selection of a component of the model 220. In response, a context object for the selected component can be identified and elements of the context or the context object itself (or a reference thereto) can be provided to a coupled handler 250 responsible for invoking a simplification of the user interface for the workbench 230 in response to the selection of a new context within the workbench 230. The handler 250 in turn can provide the context to the tool item service 270.

The tool item service 270 can include program code enabled to loop through each tool item provider 280 providing tool items for the workbench 230 to identify tool items mapped to elements of the provided context object or elements of other context objects. Additionally, the program code of the tool item service 270 can be enabled to compute an intersection of the identified tool items both to eliminate redundancies amongst the tool items and also to ensure that tool items common to all context objects remain. Finally, the program code of the tool item service 270 can be enabled to render the selected tool items as viewable in the workbench 210 while other tool items can be hidden from view in the workbench 210.

In yet further illustration, FIG. 3 is a flow chart showing a process for extensible context based user interface simplification for a model driven development tool. Beginning in block 310, a selection change can be detected in the model driven development tool such as the selection of a component in a model accessible through the model driven development tool or a different model in its entirety. In block 320, a new context object for the selection in the model driven development tool can be determined and in block 330, a context can be determined for the context object.

In block 340, different providers of tool items in the model driven development tool can be queried to determine support for the determined context. In decision block 350, if a provider of tool items can be located, in block 360 a registry of tool items can be consulted to select those of the tool items provided by the provider that have been mapped to the determined context. Thereafter, in decision block 370 if more providers remain to be processed, in block 340 another provider of tool items can be located that supports the context. In decision block 370, when no further providers of tool items remain to be processed, in block 380 the intersection of selected tool items can be computed and in block 390 the resultant set of tool items can be enabled for viewing in the model driven development environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for extensible context based user interface simplification for a model driven development tool, the method comprising:
   executing the model driven development tool in a memory of a host computer, the tool comprising a multiplicity of user interface components including tool items and also model components of a model loaded for processing in the tool;
   registering different ones of the tool items in a tool item registry in association with corresponding contexts of the model driven development tool;
   detecting a context of the contexts change to a new context in the model driven development tool based upon a selection of a new one of the model components in the model driven development tool, wherein detecting the context change to the new context in the model driven development tool comprises detecting the selection of the new model component associated with a context object in the model driven development tool, the context object providing the new context;
   locating ones of the tool items in the registry mapped to the new context; and,
   displaying the located tool items in the model driven development tool.

2. The method of claim 1, wherein detecting the context change to the new context in the model driven development tool, comprises detecting a selection of a new model associated with a context object in the model driven development tool, the context object providing the new context.

3. The method of claim 1, wherein locating tool items mapped to the new context, comprises:
   locating a plurality of tool item providers providing tool items for the new context; and,
   selecting only ones of the tool items mapped to the new context.

4. The method of claim 3, further comprising further selecting an intersection of the ones of the tool items mapped to the new context and also ones of the tool items mapped to other contexts.

5. The method of claim 1, wherein displaying the located tool items in the model driven development tool, further comprises hiding tool items configured for mapping to contexts, but not mapped to the new context.

6. A model driven development data processing system comprising:
   a processor,
   a model driven development tool executed by the processor in a memory of a host computer;
   a model loaded for processing in the model driven development tool, the model comprising a multiplicity of model components;
   a tool item registry of tool items registered different ones of the tool items in association with corresponding contexts of the model driven development tool;
   a listener coupled to the workbench and configured to detect a context of the contexts change to a new context in the model driven development tool based upon a selection of a new one of the model components in the model driven development tool, wherein detecting the context change to the new context in the model driven development tool comprises detecting the selection of the new model component associated with a context object in the model driven development tool, the context object providing the new context;
   a tool item locater located ones of the tool items in the registry mapped to the new context; and,
   a workbench in the model driven development tool displayed the located tool items in the model driven development tool.

7. The system of claim 6 wherein the tool items comprise tool items selected from the group consisting of menus, menu items, context menu items, toolbar actions, and palette entries.

8. A computer program product comprising a non-transitory computer usable storage medium storing computer usable program code for extensible context based user interface simplification for a model driven development tool, the computer program product comprising:
   computer usable program code for executing the model driven development tool in a memory of a host computer, the tool comprising a multiplicity of user interface components including tool items and also model components of a model loaded for processing in the tool;

computer usable program code for registering different ones of the tool items in a tool item registry in association with corresponding contexts of the model driven development tool;

computer usable program code for detecting a context of the contexts change to a new context in the model driven development tool based upon a selection of a new one of the model components in the model driven development tool, wherein detecting the context change to the new context in the model driven development tool comprises detecting the selection of the new model component associated with a context object in the model driven development tool, the context object providing the new context;

computer usable program code for locating ones of the tool items in the registry mapped to the new context; and, computer usable program code for displaying the located tool items in the model driven development tool.

9. The computer program product of claim 8, wherein the computer usable program code for detecting the context change to the new context in the model driven development tool, comprises computer usable program code for detecting a selection of a new model associated with a context object in the model driven development tool, the context object providing the new context.

10. The computer program product of claim 8, wherein the computer usable program code for locating tool items mapped to the new context, comprises:

computer usable program code for locating a plurality of tool item providers providing tool items for the new context; and, computer usable program code for selecting only ones of the tool items mapped to the new context.

11. The computer program product of claim 10, further comprising computer usable program code for further selecting an intersection of the ones of the tool items mapped to the new context and also ones of the tool items mapped to other contexts.

12. The computer program product of claim 10, wherein the computer usable program code for displaying the located tool items in the model driven development tool, further comprises computer usable program code for hiding tool items configured for mapping to contexts, but not mapped to the new context.

* * * * *